J. B. ALLEN.
WRENCH.
APPLICATION FILED FEB. 23, 1911.
995,211.
Patented June 13, 1911.
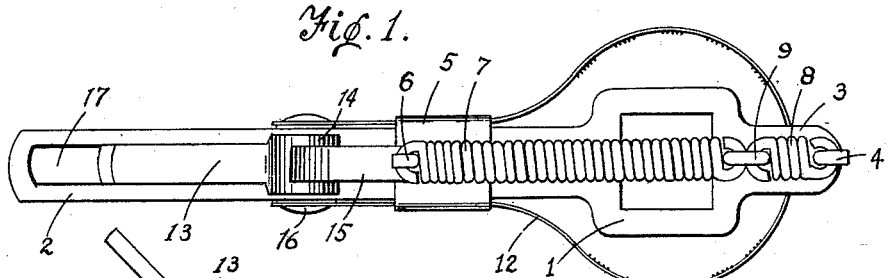
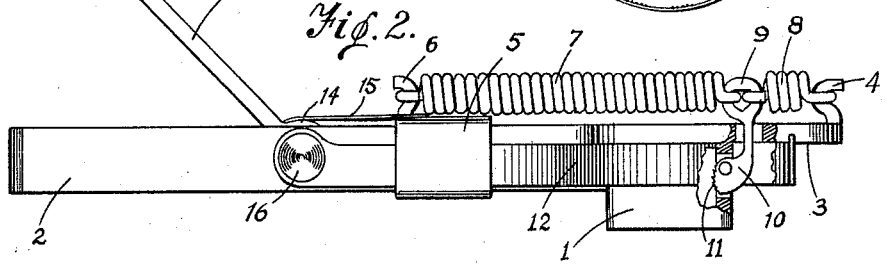
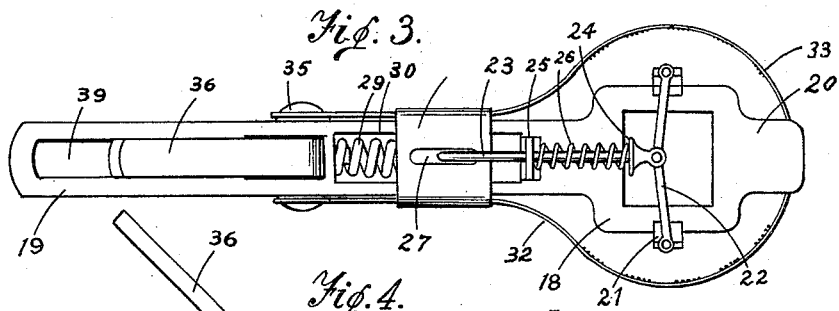
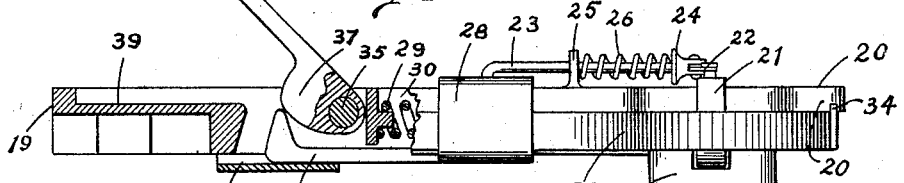
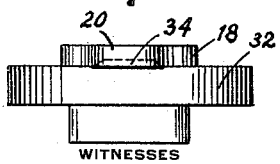
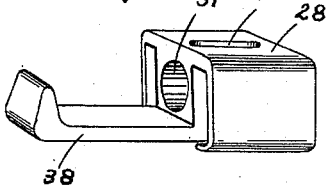
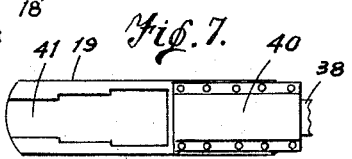
WITNESSES
F. M. Keeney.
INVENTOR
James B. Allen

UNITED STATES PATENT OFFICE.

JAMES B. ALLEN, OF SAN DIEGO, CALIFORNIA.

WRENCH.

995,211.  Specification of Letters Patent.  Patented June 13, 1911.

Application filed February 23, 1911. Serial No. 610,121.

*To all whom it may concern:*

Be it known that I, JAMES B. ALLEN, a citizen of the United States, residing at San Diego, in the county of San Diego and State of California, have invented a new and useful Wrench, of which the following is a specification.

This invention relates to wrenches and its purposes are the provision of a device of simple and efficient mechanism, having new and novel arrangement of parts, hereinafter described, adapted to clasp the hub of a vehicle wheel, and to hold the axle-nut firmly within the wrench socket, when the wheel is to be removed from the vehicle.

Another purpose is to provide a device for removing the nut and wheel from the axle, without bringing the hands in contact with the grease and oil which may be collected on the hub and on the nut, thereby enabling the operator to grease or oil a wagon or vehicle without soiling the hands or the clothing.

Another advantage attained by the use of this device is the convenience of having the nut and wheel removed at one operation; one movement of the lever on the handle of the wrench causing the device to engage with the hub of the vehicle wheel and the axle-nut simultaneously, thereby saving time when the wheel is to be removed for lubricating purposes.

It is more particularly a device in which a circular band having a ribbed or knurled inner surface, is adapted to encircle and clasp the hub of a wheel, and the socket which engages with the nut on the axle of the vehicle is provided with dogs having a gripping surface engaging with the sides of the nut; a spring normally holding the hub band and the gripping dogs in an operative position, and a lever being provided which simultaneously releases the device from the axle-nut and the hub; all parts of the mechanism being such that the device may be cheaply constructed, and produced at a small cost.

These objects and advantages are attained by the particular embodiment of my invention herein described and claimed and illustrated in the accompanying drawings, in which:

Figure 1 is a top plan view of this invention, having a tension spring to hold the clasping and gripping parts in an operative position. Fig. 2 is a side elevation of the device shown in Fig. 1. Fig. 3 is a top plan view of a modification of this invention, having a spring acting in the reverse manner to the spring shown in Fig. 1, to hold the clasping and binding parts in an operative position. Fig. 4 is a side elevation of the device shown in Fig. 3. Fig. 5 is a detail view of the binding sleeve shown in Figs. 3 and 4. Fig. 6 is a detail view of the method of attaching the clasping band to the extension on the socket end of the wrench, as shown in Figs. 1, 2, 3, and 4. Fig. 7 is a plan view of the bottom of the handle.

Referring more particularly to the drawings in which similar characters of reference are used to designate corresponding parts of the device, numeral 1 indicates the socket portion of the wrench, and 2, the handle portion thereof. An extension 3, projecting from the socket portion of the wrench, is provided with a hook 4, and a sleeve 5, slidably mounted on the handle, is provided with a hook 6; springs 7 and 8, being interposed between hooks 4 and 6, and normally tending to pull sleeve 5, toward socket 1. A link 9, connects springs 7 and 8, and is formed on the lever end of a gripping dog 10, which is pivoted in the wall of socket 1; the dog having serrated teeth 11, which normally project within the socket and tend to grip the wrench to the axle-nut. Teeth 11, are pointed in a direction which will cause the axle-nut to be retained within the socket, when detached from the axle.

A clasping band 12 is attached to handle 2 and to extension 3, and is adapted to encircle the hub of a vehicle wheel when the axle-nut is within the socket of the wrench; sleeve 5 being arranged to draw the band normally into a tight position upon the outside of that portion of the hub which extends over the axle-nut.

A pivoted lever 13, having a drum 14 on the pivoted end, is mounted on the handle, and a thin steel band 15, having one end secured to the drum and the other end secured to the sliding sleeve, is provided for releasing the clasping band and the gripping dog, from their normal position. Lever 13 is pivoted on shaft 16, the ends of which are riveted on the ends of the clasping band, thereby securing them to the handle. A groove 17, in the handle, is provided, whereby lever 13 may be held down flush with the handle when the wrench is to be applied to the wheel and axle-nut of a vehicle. Clasping band 12 is provided with a knurled inner surface for gripping more tightly to the hub of a wheel.

In the modified form of my invention, the socket portion 18, is provided with a handle 19, and a supporting extension 20. Gripping dogs 21, extend in the socket and are normally held in an operative position by levers 22, which are pivoted to the upper ends of the dogs and to rod 23. A bearing shoulder 24 is provided on the rod, which extends through a projecting flange 25, on the handle; a spring 26, being interposed between projection 25 and shoulder 24, and normally tending to force them apart. The end of rod 23, is bent to engage with slot 27 on sleeve 28, whereby the dogs may be operated by moving the sleeve. Spring 29 interposed between the end wall of slot 30 and the inner end of retaining cavity 31, within the sleeve, normally operates to force the sleeve toward the socket, and thereby contract clasping band 32, which is adapted to engage with the hub of a wheel; a knurled surface 33, being provided to secure a tight grip and to prevent slipping. An extension 34, on band 32, is provided for securing the band to extension 20; the ends of the band being held by the riveted ends of bolt 35.

Lever 36, having an eccentric cam portion 37, is pivoted on bolt 35, the cam portion being adapted to engage with hook 38, which extends from sleeve 28. Lever 36 is operated by pressing the same into slot 39, thereby drawing sleeve 28, away from the socket and releasing band 32 and dogs 21. A supporting band 40, is secured to the under side of the handle and forms a guide for hook 38. The handle is provided with a slot 41, on the under side of the handle, adapted for use on the various other nuts which are usually found on a vehicle.

In operation the lever on the handle is pressed down into the slot provided therefor, which releases the clasp band and the gripping dogs, allowing the wrench to be applied to a vehicle wheel and the axle-nut. Releasing the lever will cause the springs to throw the device into an operative position. The axle-nut may be started by pressing on the handle of the wrench, and at the same time turning the wheel with the other hand. The continued turning of the vehicle wheel will turn the nut off, and also the wheel. The wheel and axle-nut may be applied by reversing the operation. It will be seen that the axle-nut will be held by the wrench, in the end of the hub, while the wheel is being removed from and applied to the axle.

From the foregoing description it will be seen that simple and efficient means are herein provided for accomplishing the objects of the invention, but, while the elements shown and described are well adapted to serve the purposes for which they are intended, it is to be understood that the invention is not limited to the precise construction as set forth, but includes within its purview such changes as may be made within the scope of the appended claims, and such changes as may be made without departing from the spirit of the invention.

Having described my invention, what I claim and desire to secure by Letters Patent, is:

1. A clasp wrench for vehicles, comprising a socket portion and a handle portion, a supporting extension on the socket portion, a band having a knurled inner surface, secured to the handle and to the extension, a sleeve slidably mounted on the handle and engaging with the knurled band, a spring adapted to hold the sleeve in an operable position upon the knurled band, whereby the same will clasp upon the hub of a vehicle wheel, and a lever mounted on the handle and provided with means for operating the sliding sleeve, whereby the wrench may be applied to the axle-nut of a vehicle, and to the hub of the wheel simultaneously, substantially as shown and set forth.

2. In a clasp wrench, a socket portion adapted to engage with the axle-nut, a flexible band adapted to encircle and clasp the hub of the wheel, and gripping dogs pivotally mounted in the walls of the socket portion of the wrench, means being provided for holding the gripping dogs and the clasping band in an operable position, comprising a sleeve adapted to slide upon the handle and engage with the clasping band, and a pair of springs connecting the sleeve with a hook on the extension support on the socket portion of the wrench; a loop formed on the lever end of the dog being the link which connects the springs, substantially as shown.

3. In a clasp wrench, a socket portion, dogs pivoted in the walls of the socket portion, levers pivoted to the dogs and to a rod which extends through a flange on the handle and engages with a slot in a sliding sleeve, a spring interposed between the flange on the handle and a shoulder on the rod, and normally holding the dogs in an operable position, and a lever on the handle adapted to operate the sliding sleeve, whereby the dogs may be released for applying the wrench to an axle-nut, substantially as shown.

4. In a clasp wrench, a handle portion, a socket portion, a flexible clasping band encircling the socket portion, having the ends thereof secured to the handle portion, a sleeve slidably mounted on the handle, having a hook extending on the underside of the handle, the sleeve engaging with the clasping band, and a lever pivoted to the handle having an eccentric cam at the pivoted end, the cam being adapted to engage with the hook extending from the sleeve, and thereby force the same to release the clasping band when the lever is pressed down upon the handle, substantially as shown.

In testimony whereof, I affix my signature, in presence of two witnesses.

JAMES B. ALLEN.

Witnesses:
J. W. MASTER,
F. M. KEENEY.

Copies of this patent may be obtained for five cents each, by addressing the "Commissioner of Patents, Washington, D. C."